Figure 1:
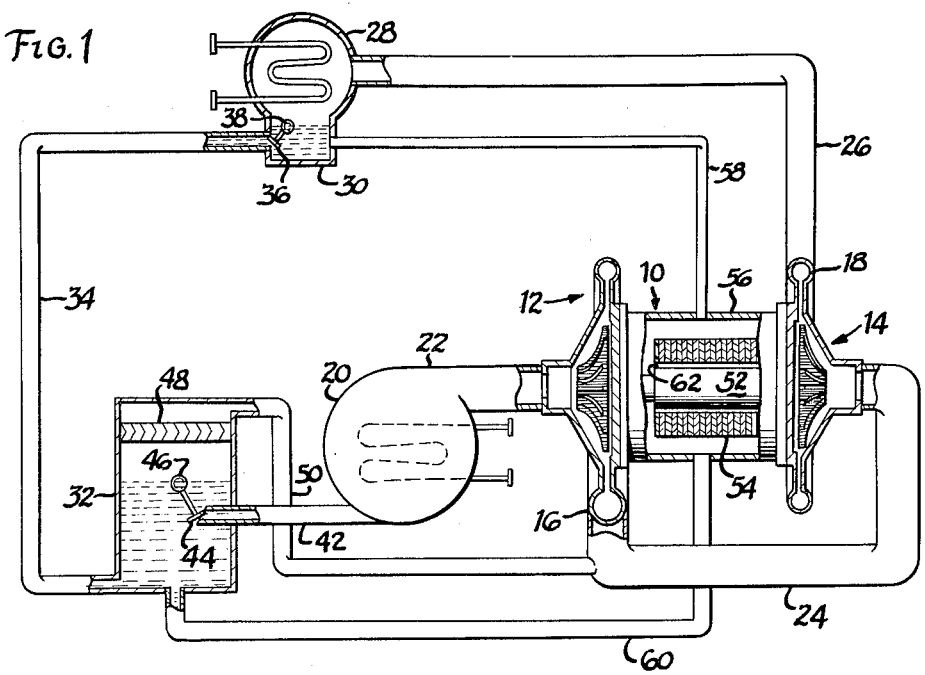

Feb. 1, 1966    P. A. WELLER ETAL    3,232,074
COOLING MEANS FOR DYNAMOELECTRIC MACHINES
Filed Nov. 4, 1963

INVENTORS
PETER A. WELLER
BY  HOLLIS C. GRUBB
WILSON, SETTLE & CRAIG
ATTORNEYS

United States Patent Office 3,232,074
Patented Feb. 1, 1966

3,232,074
COOLING MEANS FOR DYNAMOELECTRIC MACHINES
Peter A. Weller, Farmington, and Hollis C. Grubb, Southfield, Mich., assignors to American Radiator & Standard Sanitary Corporation, New York, N.Y., a corporation of Delaware
Filed Nov. 4, 1963, Ser. No. 321,250
2 Claims. (Cl. 62—505)

This invention relates to cooling dynamoelectric machines, and more particularly to cooling of a dynamoelectric machine by incorporating the machine into a refrigeration system having a high pressure side, an intermediate pressure side and a low pressure side.

The present invention is an improvement over copending application Serial No. 36,256, filed June 15, 1960, now Patent No. 3,112,618, issued December 3, 1963.

Heavy duty dynamoelectric machines, such as electric motors utilized for driving heavy duty refrigerant compressors for industrial air conditioning installations, have conventionally been either air or water cooled. Of necessity, when air-cooled, such dynamoelectric machines have been built to extremely large dimensions to provide adequate radiation surfaces to permit the large quantity of heat generated thereby to be dissipated. The prior art air-cooled constructions have often resulted in electric motors that are of actually larger physical size than the efficient, rotary centrifugal compressors which they drive. As a result, such large driving motors and the attendant component structures of the refrigeration system have taken substantial amounts of valuable room from within the building structure where they are located. Further, the weight of these large motor units has often required supplemental bracings or building supports.

Cooling of motors by heat exchange with water coils is an advance over air-cooling. However, water cooling has required substantial amounts of auxiliary equipment in the form of pumps, cooling towers and the like, as well as extensive plumbing with flow control valves and associated structures. Also problems of water treating to prevent scale, corrosion and algae formation, freezing and malfunctions involving dangerous, high pressure steam formations have been involved, requiring frequent cleaning and maintenance. Also, water cooling apparatus is large and cumbersome, requiring exterior cooling spray towers and the like.

Recently, efforts have been made to inject liquid refrigerant into the interior of a motor to be evaporated therein and thereby provide efficient operation with adequate cooling and, at the same time, reducing the physical size of the unit.

Cooling by liquid refrigerant is accomplished, in accordance with the present invention, in a refrigeration system having three pressure sides, high, low and intermediate.

An object of the present invention is to provide a cooling system for a dynamoelectric machine in a refrigeration system having high, low and intermediate pressure sides.

Another object of the invention is to provide a method for cooling dynamoelectric machines in which the intermediate pressure point of the system is utilized either to supply liquid refrigerant to the motor or to receive vaporized refrigerant from the motor casing.

Another important object is to provide a method for cooling a dynamoelectric machine utilizing a liquefied refrigerant wherein the refrigerant is vaporized in intimate contact with the interior parts of the machine.

A still further object of the invention is to provide motor cooling means in a refrigeration system having a multi-stage compressor.

A still further object of the invention is to provide a dynamoelectric machine cooling system in a refrigeration system having a condenser, an evaporator, a multi-stage compressor and an economizer connected together in operable relation.

Other objects of this invention will appear in the following description and appended claims, reference being had to the accompanying drawings forming a part of this specification wherein like reference characters designate corresponding parts in the several views.

Figure 2:
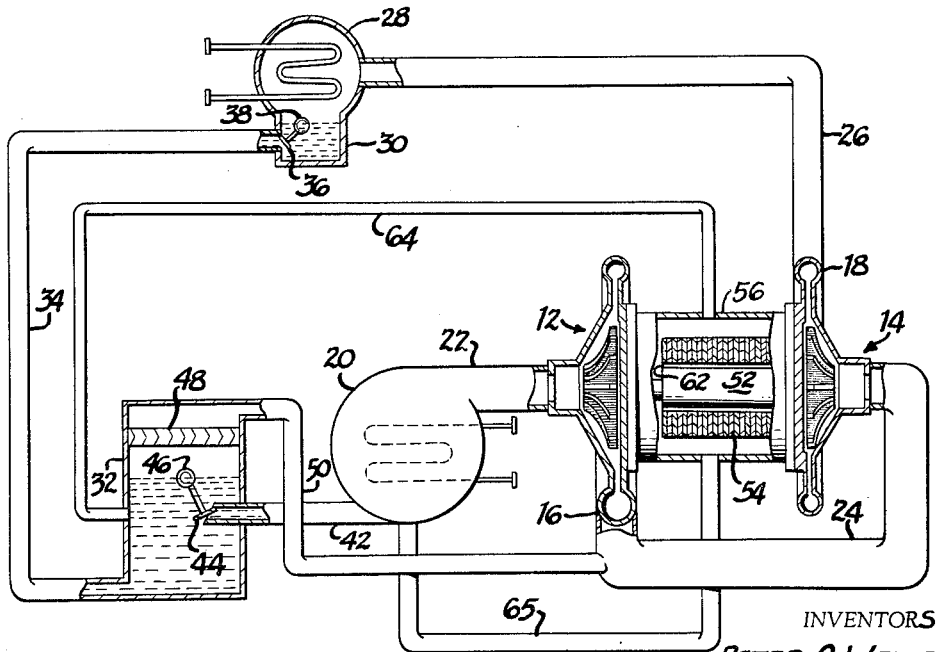

In the drawings:

FIGURE 1 is a diagramatic view illustrating one embodiment of the invention wherein liquid refrigerant is injected into the dynamoelectric machine from the high pressure condenser sump and is exhausted to the intermediate pressure economizer; and FIGURE 2 is a diagrammatic view similar to FIGURE 1 illustrating a second embodiment of the invention wherein liquid refrigerant is injected into the dynamoelectric casing from the intermediate pressure economizer and is exhausted from the machine casing to the low pressure evaporator.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring to FIGURE 1, there is shown a refrigeration system comprising an electric motor 10 which drives at one end a first centrifugal compressor stage 12 and at the other end a second centrifugal compresser stage 14. Each compressor is provided with an impeller having the usual radial vanes for pumping the evaporated refrigerant into the outlet scrolls 16, 18.

The first stage compressor 12 draws vaporized refrigerant from the evaporator 20 through conduit 22. Partially compressed refrigerant is then drawn from the outlet of the first compression stage 12 to the inlet of the second compression stage 14 by cross-over conduit 24. Hot compressed gas is then fed into the conduit 26 from the second compression stage 14. The conduit 26 discharges into the tube type condenser 28.

Condensed refrigerant is discharged in liquid from the condenser 28 to a sump 30. The sump 30 is connected to the lower portion of an economizer 32 by conduit 34. Flow is controlled from the sump 30 to the economizer 32 by means of a butterfly valve 36 which is provided with a float 38 to maintain the liquid level in the sump constant. This arrangement prevents condenser gases from entering conduit 34.

The economizer 32 is connected to the evaporator 20 by means of a conduit 42. The liquid level in the economizer is maintained at the desired point by means of a butterfly valve 44 and attached float 46. It will be appreciated that valve 44 closes the conduit 42 when the liquid level within the economizer drops below a predetermined level. Thus, liquid refrigerant flows from the economizer into the evaporator during periods when the valve 44 is open. The level in the economizer cannot fall below the level of the conduit 42. Thus, refrigerant gases present in the economizer will never be fed into the evaporator.

A liquid eliminator 48 is provided across the economizer casing above the liquid level in the economizer, A vent line 50 extends from a point above the eliminator 48 into connection with the cross-over conduit 24 between the first and second stages of compression. Thus, refrigerant gases present within the economizer are exhausted to the compressor at the intermediate state of compression with the result that the pressure within the economizer is at an intermediate pressure stage with respect to the pressure in the evaporator 20 and the condenser 28.

As will be appreciated from the above discussion, in a two-stage centrifugal compressor system, partial compression takes place in the first stage 12. The partially compressed gases are passed from the first stage 12 to the second stage 14 by means of the cross-over conduit 24. The gases are further compressed in the second stage 14 and are then discharged to the condenser 28.

When two stages of compression are used, the economizer 32 may be utilized. The economizer, as previously stated, acts at an intermediate pressure between the condenser 28 and evaporator 20. The economizer acts as a liquid trap for controlled flow of liquid refrigerant into the evaporator. A certain amount of refrigerant will evaporate in the economizer. It is not desirable to inject this refrigerant vapor into the evaporator because it will not function efficiently to cool. However, the vaporized gases are at a relatively high pressure, that is, at a pressure higher than the vaporized gases within the evaporator 20. These relatively high pressure refrigerant vapors are conducted directly to the second stage of compression 14 by means of the conduit 42. Thus, these gases bypass the first stage of compression. This results in a power saving because these gases do not go through the first stage of compression. The work-load of the first stage of compression is thus reduced.

Another advantage of the economizer 32 is that the refrigerant gases which vaporize therein cool the liquid refrigerant which is then subsequently injected into the evaporator 20. This pre-cooled refrigerant has a greater latent capacity for absorbing heat within the evaporator. Thus, the total cooling capacity of the condensed body of refrigerant is conserved, while at the same time the power necessary to operate the compressor is reduced.

Referring now to the motor 10, it will be noted that the rotor 52 and stator 54 are sealed within casing 56. A conduit 58 leads from the casing 56 to the sump 30. Liquid refrigerant is thus received from the sump 30 and injected into the casing 56. The refrigerant will be completely or partially vaporized within the casing to cool the motor parts. The vaporized refrigerant is exhausted from the motor casing 56 by means of a conduit 60 which leads to the economizer 32.

It will be noted that the conduit 58 leading from the sump 30 to the motor casing 56 is of relatively small diameter. Thus, only a relatively small part of the liquid refrigerant discharged from the condenser 28 is directed into the motor casing. By this arrangement the refrigerating system of condenser and evaporator is enabled to operate efficiently without excessive substraction of refrigerant and without overcooling of the motor 10. The relative amount of liquid diverted from the sump 30 into the conduit 58 may be varied in accordance with such factors as capacity of the system, motor size and design temperatures of the motor and system. In the usual situation, the diverted refrigerant is only a small percent of the total refrigerant as, for example, two or three percent. In a majority of cases, the diverted refrigerant will be less than ten percent.

Various structures may be provided within the casing 56 to most effectively and uniformly cool the motor. For example, a spray orifice may be provided to distribute all or a substantial part of the refrigerant directly into the gap 62 between the rotor 52 and stator 54.

In the illustrated embodiment, the refrigerant travels through the motor windings and is then discharged into the exhaust conduit 60 in the gaseous state. Preferably, conduit 60 is of greater diameter than conduit 58 so that the pressure in the conduit 60 does not rise excessively such as might interfere with proper circulation of refrigerant through the motor. When a high cooling rate is desired, the quantity of liquid refrigerant introduced into the motor 10 is somewhat in excess of that which can be vaporized with the result that some liquid refrigerant will return with the gas through conduit 60.

It is important in connection with the present invention to note that the inlet conduit 58 to the motor 10 is connected to a high pressure point in the refrigeration system, namely, the condenser; while the outlet conduit 60 is connected to an intermediate pressure point in the system, namely the economizer 32. This results in effective cooling while at the same time maintaining efficiency in that the vaporized refrigerant from the motor 10 will pass from the economizer 32 directly into the second stage of compression 14. Consequently, a power saving is effected in that the gaseous refrigerant is not passed through the first stage of compression 12.

Referring to FIGURE 2, it will be noted that the system disclosed therein is very similar to that shown in FIGURE 1. Accordingly, where appropriate, the same reference numerals have been utilized.

The difference between the FIGURE 2 and FIGURE 1 embodiment is that instead of injecting liquid refrigerant into the motor casing 56 from the condenser sump 30, liquid refrigerant is injected into the motor casing from the economizer 32. As will be noted, a conduit 64 extends from a point below the liquid level in the economizer 32 to the motor casing 56.

In conformity with this method of injecting liquid refrigerant into the motor casing, vaporized refrigerant is exhausted from the motor casing, not to the economizer 32, but to the evaporator 20. Thus, liquid refrigerant is taken from the intermediate pressure point represented by the economizer 32 and is exhausted by conduit 65 to the low pressure point represented by the evaporator 20. This results in approximately the same savings as occur in the FIGURE 1 embodiment. That is, the liquid refrigerant in the economizer 32 has been pre-cooled by vaporization of a portion thereof. This pre-cooled refrigerant is injected into the motor casing 56 and has a high cooling effect as compared to refrigerant which has not been pre-cooled.

The extended scope of the present invention would include a motor or generator denoted by the terminology "dynamoelectric machine," positioned in an analogous manner with respect to the system as the compressor motor. Thus, refrigerant can be bled from the system in the same manner to cool either an adjacent or remote dynamoelectric machine; it being understood, of course, that the compressor-condenser capacity of the system will be greater than the maximum demands made upon the evaporator.

Having thus described our invention, we claim:

1. For use with a refrigeration system including a multistage compressor coupled to a condenser to deliver compressed refrigerant gases thereto, an economizer coupled to the condenser to receive liquid refrigerant therefrom, an evaporator coupled to the economizer to receive liquid refrigerant therefrom, flow control means between the evaporator and economizer to maintain a predetermined liquid level in the economizer, a vent conduit extending from the economizer at a point above the liquid level therein and coupled to an intermediate stage of the compressor to deliver refrigerant gases thereto, said refrigeration system having a high pressure condenser side, an intermediate pressure economizer side and a low pressure evaporator side, the improvement of an electric machine having a rotor and stator separated by an annular gap and provided with a sealed casing, a first conduit connected at one end to said casing and at the other end to the high pressure condenser side for introducing liquid refrigerant into direct contact with the heat-producing parts of the machine and a second conduit for exhausting the refrigerant from contacting relation with the machine, said second conduit connected at one end to said casing and at the other end to the intermediate pressure economizer side.

2. For use with a refrigeration system including a multi-stage compressor coupled to a condenser to deliver compressed refrigerant gases thereto, an economizer coupled to the condenser to receive liquid refrigerant therefrom, an evaporator coupled to the economizer to receive liquid refrigerant therefrom, flow control means between the evaporator and economizer to maintain a predetermined liquid level in the economizer, a vent conduit extending from the economizer at a point above the liquid level therein and coupled to an intermediate stage of the compressor to deliver refrigerant gases thereto, said refrigeration system having a high pressure condenser side, an intermediate pressure economizer side and a low pressure evaporator side, the improvement of an electric machine having a rotor and stator separated by an annular gap and provided with a sealed casing, a first conduit connected at one end to said casing and at the other end to the intermediate pressure economizer side for introducing liquid refrigerant into direct contact with the heat-producing parts of the machine and a second conduit for exhausting the refrigerant from contacting relation with the machine, said second conduit connected at one end to said casing and at the other end to the low pressure evaporator side.

References Cited by the Examiner
UNITED STATES PATENTS

| | | | |
|---|---|---|---|
| 2,768,511 | 10/1956 | Moody | 62—505 |
| 2,986,905 | 6/1961 | Kocher et al. | 62—505 X |
| 3,011,322 | 12/1961 | Tanzberger et al. | 62—196 |
| 3,022,638 | 2/1962 | Caswell et al. | 62—505 X |
| 3,088,042 | 4/1963 | Robinson | 62—505 |

FOREIGN PATENTS 863,955   3/1961   Great Britain.

ROBERT A. O'LEARY, *Primary Examiner.*